US012632072B2

(12) United States Patent
van der Kamp et al.

(10) Patent No.: US 12,632,072 B2
(45) Date of Patent: May 19, 2026

(54) CONTROL DEVICE FOR REGULATING THE PRESSURE OF A FLUID

(71) Applicant: Aptco Technologies GmbH, Berlin (DE)

(72) Inventors: Kees Jan van der Kamp, Ottendorf-Okrilla (DE); Marcus Kruschinski, Berlin (DE)

(73) Assignee: Aptco Technologies GmbH, Berlin (DE)

( * ) Notice: Subject to any disclaimer, the term of this patent is extended or adjusted under 35 U.S.C. 154(b) by 21 days.

(21) Appl. No.: 18/617,297

(22) Filed: Mar. 26, 2024

(65) Prior Publication Data

US 2024/0329672 A1     Oct. 3, 2024

(30) Foreign Application Priority Data

Mar. 27, 2023     (DE) .......................... 102023107631.0

(51) Int. Cl.
*G05D 16/20*          (2006.01)
*G01N 15/08*          (2006.01)
*G05D 16/00*          (2006.01)

(52) U.S. Cl.
CPC ..... *G05D 16/2013* (2013.01); *G01N 15/0806* (2013.01); *G01N 15/0826* (2013.01);
(Continued)

(58) Field of Classification Search
CPC ........... G05D 16/2013; G05D 16/2033; G05D 16/204; G05D 16/2044; G05D 16/028;
(Continued)

(56) References Cited

U.S. PATENT DOCUMENTS

| | | | | |
|---|---|---|---|---|
| 2,306,060 A | * | 12/1942 | Jacobsson | ............ G05D 16/185 |
| | | | | 137/488 |
| 2,643,208 A | * | 6/1953 | Mcchesney | ......... E21B 33/1243 |
| | | | | 166/187 |

(Continued)

FOREIGN PATENT DOCUMENTS

| | | | |
|---|---|---|---|
| DE | 1020066013538 A1 | 10/2007 | |
| JP | H11-316612 A | 11/1999 | |
| WO | WO-2016198149 A1 * | 12/2016 | ........... G05D 16/202 |

OTHER PUBLICATIONS

Translation of WO-2016198149.*

*Primary Examiner* — William M Mccalister
(74) *Attorney, Agent, or Firm* — Workman Nydegger

(57)     ABSTRACT

A control device for controlling the pressure of a fluid, and a porometer that includes the control device. A regulating unit includes a pipe system for conveying a fluid and a regulating device associated with the pipe system. The regulating unit includes a first pressure regulator and a second pressure regulator, and the first and second pressure regulators each generate a regulating variable for an actuator for configuring the flow of the fluid in the pipe system; and a controller. The first pressure regulator is arranged on the inlet side in the pipe system. The second pressure regulator is arranged in series downstream of the first pressure regulator with respect to the direction of flow of the fluid in the pipe system. The controller is configured to specify a pressure setpoint value as a reference variable for the first pressure regulator and the second pressure regulator.

17 Claims, 5 Drawing Sheets

(52) U.S. Cl.
CPC ....... *G05D 16/028* (2019.01); *G05D 16/2086* (2013.01); *Y10T 137/2562* (2015.04); *Y10T 137/7795* (2015.04)

(58) Field of Classification Search
CPC ........... G05D 16/2086; G01N 15/0826; G01N 15/0806; Y10T 137/7795; Y10T 137/2562
USPC ............................................. 137/505.12, 110
See application file for complete search history.

(56) References Cited

U.S. PATENT DOCUMENTS

| | | | | |
|---|---|---|---|---|
| 3,294,105 A * | 12/1966 | Schaub | F04D 15/0072 | 137/118.06 |
| 3,808,794 A * | 5/1974 | Wood | F01D 15/00 | 60/671 |
| 3,879,984 A * | 4/1975 | Welland | G01N 30/32 | 137/599.09 |
| 4,030,523 A * | 6/1977 | Cram | G05D 7/0652 | 137/599.07 |
| 4,560,044 A * | 12/1985 | Nagata | F16H 61/067 | 192/52.4 |
| 4,644,967 A * | 2/1987 | Wyatt | F22B 35/00 | 137/599.05 |
| 4,799,511 A * | 1/1989 | Azimov | G05D 7/01 | 137/505.12 |
| 5,329,965 A * | 7/1994 | Gordon | G05D 7/0652 | 137/599.07 |
| 5,677,500 A * | 10/1997 | Ackerley | F16K 37/0091 | 700/301 |
| 5,865,205 A * | 2/1999 | Wilmer | G05D 7/0635 | 73/1.16 |
| 5,954,089 A * | 9/1999 | Seymour | G05D 16/2033 | 700/282 |
| 6,216,726 B1 * | 4/2001 | Brown | G01F 1/88 | 137/486 |
| 6,333,272 B1 * | 12/2001 | McMillin | H01L 21/67069 | 438/935 |
| 6,505,501 B1 * | 1/2003 | Murphy | F16K 37/0083 | 73/37 |
| 6,532,978 B1 * | 3/2003 | Muller-Kuhrt | G05D 11/132 | 137/118.04 |
| 8,019,481 B2 * | 9/2011 | Yamaguchi | G05D 11/132 | 700/282 |
| 8,418,714 B2 * | 4/2013 | Ohmi | G01F 1/363 | 137/625.3 |
| 8,944,095 B2 * | 2/2015 | Okabe | C23C 16/52 | 137/486 |
| 11,209,842 B1 * | 12/2021 | Soliman | F17D 1/20 | |
| 11,680,318 B2 * | 6/2023 | Woelk | C23C 16/45561 | 366/348 |
| 2003/0196696 A1 * | 10/2003 | Meckes | B64D 11/00 | 137/109 |
| 2004/0112435 A1 * | 6/2004 | Olander | G05D 7/0652 | 137/487.5 |
| 2005/0087238 A1 * | 4/2005 | Wilson | G05D 16/204 | 137/599.07 |
| 2005/0199342 A1 * | 9/2005 | Shajii | G05D 7/0664 | 137/9 |
| 2008/0223467 A1 * | 9/2008 | Tveita | E21B 34/16 | 137/511 |
| 2008/0264646 A1 * | 10/2008 | Sten-Halvorsen | E21B 33/0355 | 166/368 |
| 2011/0094596 A1 * | 4/2011 | Sugiyama | G05D 7/00 | 137/552 |
| 2012/0298040 A1 * | 11/2012 | Woelk | C23C 16/45557 | 427/248.1 |
| 2019/0203133 A1 * | 7/2019 | Welker | G05D 7/0641 | |
| 2019/0294184 A1 * | 9/2019 | Al Khunaizi | E21B 34/102 | |
| 2020/0249706 A1 * | 8/2020 | Al Khunaizi | G05D 16/204 | |
| 2022/0404846 A1 * | 12/2022 | Ballantine | G05D 16/204 | |

* cited by examiner

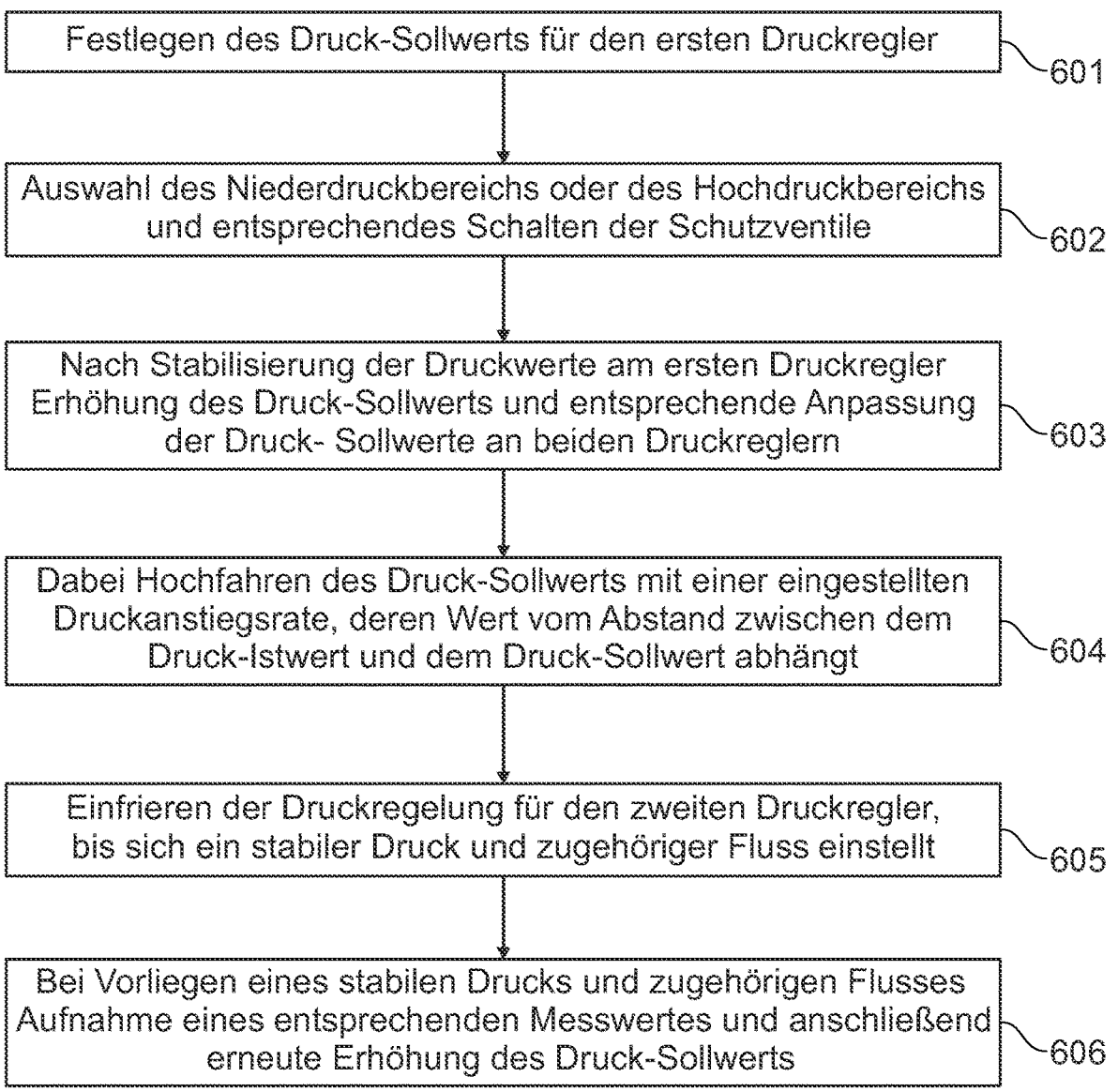

Festlegen des Druck-Sollwerts für den ersten Druckregler ⎯601

Auswahl des Niederdruckbereichs oder des Hochdruckbereichs und entsprechendes Schalten der Schutzventile ⎯602

Nach Stabilisierung der Druckwerte am ersten Druckregler Erhöhung des Druck-Sollwerts und entsprechende Anpassung der Druck- Sollwerte an beiden Druckreglern ⎯603

Dabei Hochfahren des Druck-Sollwerts mit einer eingestellten Druckanstiegsrate, deren Wert vom Abstand zwischen dem Druck-Istwert und dem Druck-Sollwert abhängt ⎯604

Einfrieren der Druckregelung für den zweiten Druckregler, bis sich ein stabiler Druck und zugehöriger Fluss einstellt ⎯605

Bei Vorliegen eines stabilen Drucks und zugehörigen Flusses Aufnahme eines entsprechenden Messwertes und anschließend erneute Erhöhung des Druck-Sollwerts ⎯606

Fig. 6

CONTROL DEVICE FOR REGULATING THE PRESSURE OF A FLUID

RELATED APPLICATION AND PRIORITY CLAIM

This application is related to and claims priority to German Patent Application No. 10 2023 107 631.0, filed on Mar. 27, 2023, and entitled "Regelvorrichtung zur Regelung eines Drucks eines Fluids", which is hereby incorporated by reference in its entirety.

FIELD OF THE DISCLOSURE

The disclosure relates to a control device for controlling the pressure of a fluid and to a porometer with such a control device.

BACKGROUND

Porometry concerns methods for determining the pore size in any material. The measuring principle is based on overcoming a capillary force. The core process of porometry is pressure control. It is necessary to control the pressure with high precision in the millibar range so that the porometer is able to "stop" at certain pressure points to which the pores of a sample open. It should be noted that porometric measurement is a highly dynamic process, as the opening of pores during the measurement leads to changing flow rates through the pore openings, which can be associated with a sudden drop in pressure across the sample.

Conventional porometers, such as those marketed by IB-FT GmbH in 12277 Berlin under the name "POROLUX™ 1000", allow the pore size to be measured very accurately and enable the actual pore size distribution to be calculated. Pressure is regulated by means of a pressure regulator and a downstream, motor-controlled needle valve, whereby the pressure regulator provides an upstream pressure and the downstream needle valve takes over the fine regulation.

Such a measuring method must work with a certain inertia of the system. If, for example, a sample with a very homogeneous and narrow pore size distribution is tested, approx. 80-90% of all the pores in the sample open within a few milliseconds, which leads to a significant drop in pressure in the system. The system takes a long time to compensate for this and continue the measurement. This can be disadvantageous, firstly because of the loss of time, and secondly because of the drying effects caused by the time lapse, which make the measurement less reliable.

The present invention is based on the object of providing a control device for regulating a pressure and a porometer with such a control device which have a low inertia and quickly regulate a pressure to be regulated back to a desired value after a pressure dip. It it also desirable to keep the pressure constant at certain pressure points with high accuracy.

SUMMARY

Aspects of the invention provide a control device for controlling a pressure of a fluid. The control device comprises a pipe system for conveying a fluid, the pipe system having an inlet and an outlet, and the fluid flowing in the pipe system from the inlet to the outlet. The control device further comprises a regulating unit associated with the pipe system which comprises at least two pressure regulators, which comprise a first pressure regulator and a second pressure regulator, wherein the at least two pressure regulators each generate a regulating variable for an actuator for configuring the flow of the fluid in the pipe system, and a controller. The first pressure regulator is arranged on the inlet side in the pipe system and the second pressure regulator is arranged in series downstream of the first pressure regulator with respect to the direction of flow of the fluid in the pipe system. Furthermore, it is provided that the controller is intended and designed to specify a pressure setpoint value as a reference variable for the first pressure regulator and the second pressure regulator.

The present invention is based on the idea of integrating several pressure regulators into the control device, in particular a first pressure regulator and a second pressure regulator, with the several pressure regulators being arranged in series one behind the other in relation to the flow of the fluid in the pipe system. Cascading pressure regulators leads to a significant reduction in pressure fluctuations. The first pressure regulator performs a type of pre-regulation of the pressure, on which the subsequent pressure regulator(s) can build to regulate the pressure to a pressure setpoint value in an improved manner. Aspects of the invention provide for a controller that specifies the pressure setpoint value for all of the pressure regulators. The present disclosure thus combines control by the controller with autonomous or partially autonomous regulation by the individual pressure regulators.

The improved pressure control makes it possible to keep the pressure setpoint value at the outlet of the control device constant with high accuracy and to quickly configure it again after pressure fluctuations in the system caused by external influences.

It should be noted that a pipe system within the meaning of the present disclosure can also be a hose system and a combined pipe and hose system.

One embodiment of the invention provides for the pipe system to form a compensation volume in the area between the first pressure regulator and the second pressure regulator. By providing a compensation volume, pressure fluctuations can be further attenuated and averaged. By providing a compensation volume, it is possible in particular to stop the pressure control at certain pressure points, i.e. to achieve static pressure stability. This enables virtually interference-free and highly accurate pressure control. This is achieved by the natural function of a compensation volume to absorb pressure peaks and release gas at pressure minima.

The dimensioning of the compensation volume depends on certain parameters, for example the diameter of the pipes in the pipe system and the pressures present. In general, the volume of the compensation volume can be larger than the volume of the pipe system between the first pressure regulator and the second pressure regulator, so that a clear buffer is provided. In porometric applications, for example, the compensation volume can have a volume in the range between 50 ml and 500 ml, for example in the range between 100 ml and 300 ml.

The statement "between the first pressure regulator and the second pressure regulator" is to be understood as meaning that the area between an upstream point of the pipe system, at which an actuator of the first pressure regulator acts on the flow, and a downstream point of the pipe system, at which an actuator of the subsequent pressure regulator acts on the flow, is considered.

In one embodiment, the pipe system also forms a compensation volume downstream of the second pressure regulator. If necessary, further compensation volumes can be provided in the case of additional pressure regulators. The use of a further compensation volume increases the reduction of pressure fluctuations in the system. The further compensation volume can be dimensioned in the same way or differently to the first compensation volume.

The compensation volume or volumes are provided by tanks, for example.

The fluid whose pressure is controlled by the control device according to the invention can be a gas or a liquid. In the case of porometric measurements, a gas is usually used.

The pipe system under consideration can be linearly structured, i.e. a pipe extends without branches between the inlet and the outlet. At least two pressure regulators are arranged along the pipe section.

However, aspects of the invention also include embodiments in which the pipe system forms branches. Thus, one embodiment of the invention provides that the pipe system forms two parallel pipe paths between the inlet and the outlet, wherein the at least two pressure regulators comprise the first pressure regulator, the second pressure regulator and a third pressure regulator, the first pressure regulator is located at the inlet of the pipe system before the pipe system branches into forms two parallel pipe paths, the second pressure regulator is arranged along the one pipe path, and the third pressure regulator is arranged along the other pipe path.

According to this design, the pipe system thus forms two arms, on each of which a pressure regulator is arranged. The two arms of the pipe system are brought together again before the outlet of the pipe system.

The use of two arms of the pipe system can, for example, be used to define a high-pressure region and a low-pressure region of the control device. Thus, one embodiment of the invention provides that one pipe path forms a high-pressure region of the control device, through which the fluid flows when the pressure is above a threshold pressure, and that the other pipe path forms a low-pressure region, through which the fluid flows when the pressure is below the threshold pressure. This makes it possible to use the control device according to the invention over a large pressure range up to, for example, 40 bar, with lower pressures being measured in the low-pressure region and higher pressures being measured in the high-pressure region, with the pressure regulators and valves used in the respective regions being adapted and designed accordingly.

One embodiment of this variant of the invention provides that the pipe system comprises protection valves that can be controlled by the controller, whereby the pipe path for the high-pressure region or the pipe path for the low-pressure region can be activated by controlling the protection valves. Before a measurement is carried out, the controller can determine whether the low-pressure region or the high-pressure region is to be used for the measurement to be carried out by controlling the protection valves accordingly.

A further embodiment of the invention provides that the regulating unit also has an inlet pressure sensor at the beginning of the pipe system, which measures an actual pressure value on the inlet side and feeds this to the controller. Further sensors can also be provided to supply the controller with its information. For example, one or more flow meters can also be arranged at the outlet of the pipe system, which feed the recorded signals to the controller. The controller uses the data/information received as part of control algorithms to generate a suitable pressure setpoint value to configure the pressure at a desired point in the pipe system, in particular at its outlet. By providing an inlet pressure sensor, it is possible to improve the response to pressure fluctuations at the inlet of the pipe system in particular.

A further embodiment of the invention provides that the regulating unit further comprises an outlet pressure sensor at the outlet of the pipe system, which measures an actual pressure value at the outlet of the pipe system as a controlled variable, wherein the controller detects the actual pressure value measured by the outlet pressure sensor and evaluates it in its control algorithms.

A further embodiment of the invention provides that the first pressure regulator is intended and designed to carry out pre-regulation of the pressure in the pipeline, with the first pressure regulator receiving a first pressure setpoint value from the controller. The first pressure regulator can ensure an essentially constant inlet pressure for the downstream pressure regulator, whereby this should not exceed the maximum possible inlet pressure of the downstream pressure regulator. It may also be provided that the first pressure regulator ensures an essentially constant differential pressure across the downstream pressure regulator.

A further embodiment of the invention provides that the second pressure regulator is intended and designed to carry out fine regulation of the pressure in the pipe system, with the second pressure regulator receiving a second pressure setpoint value from the controller. It should be noted that although the first pressure regulator and the second pressure regulator can be supplied with the same pressure setpoint value via the controller, this is not necessarily the case. For example, if the pressure in the pipe system is changed by the controller, it may be useful to apply different pressure setpoint values to the individual pressure regulators or to provide different time developments when changing the pressure at the respective pressure regulator.

The pressure regulators are designed, for example, as PI, PD or PID regulators.

A further embodiment of the invention provides for the pressure regulators to be designed as PI or PID regulators, with at least one of the pressure regulators being designed in such a way that the I component of the regulation in the pressure regulator is switched off or reduced, and the controller interacts with the pressure regulator in such a way that the I component of the regulation is performed by the controller. This has the advantage that the temporal behavior of the I-regulator can be changed and is under the control of the controller. The temporal behavior can therefore be selected at will, depending on the situation at hand.

One embodiment example is that in a porometric measurement, the pressure should change as little as possible during a stabilization waiting period, which is against the nature of an I-controller as soon as there is even a small difference between the setpoint value and the actual value. During such a stabilization waiting period, the controller can therefore deactivate the I-control. Another example is when a certain behavior of the I-controller is desired in other situations of a porometric measurement, which cannot be realized with an I-controller part integrated in a pressure regulator (for example, a very slow increase in pressure when the pipe system is first opened during a porometric measurement).

The outsourcing of the I component of the control to the controller also enables special pressure control for various pressure drops that can occur in the case of porometric measurement.

Furthermore, it may be provided that, alternatively or additionally, other parts of the pressure regulator are integrated into the controller. Thus, in further embodiments, it may be provided that the pressure regulator is designed as a PI, PD or PID regulator, with at least one of the pressure regulators being designed in such a way that the P component and/or the D component of the regulation in the pressure regulator is switched off or reduced, and the controller interacts with the pressure regulator in such a way that the P component and/or D component of the regulation is performed by the controller.

The variant that the I component, the P component and/or the D component of the regulation in the pressure regulator is "reduced" is to be understood to mean that a PI regulator, PD regulator or PID regulator typically works in such a way that the P (proportional), I (integral) and D (differential) components of the regulation are added, with the result of the addition being provided at the outlet of the calculation. Optionally, each component can be provided with a factor before the addition, which determines how much the respective component contributes to the final result. By reducing the factor for one or more of the components P, I, D, the corresponding component can be reduced as desired. In the limiting case, when the factor is zero, the relevant part of the control is switched off.

In a borderline case, it is possible that all logical controller components of at least one of the pressure regulators are integrated into the controller, meaning that the pressure regulator is regulated entirely by the controller. This can be achieved by switching off the corresponding controller components in the pressure regulator or by the pressure regulator not containing such controller components in the first place. In such a case, the pressure regulator only comprises an actuator, in particular a valve for configuring the flow of the fluid in the pipe system. In the limiting case under consideration, this is operated directly by the controller, which now contains all the logical controller components.

In embodiments of the invention, the controller is configured to realize a pressure increase in the pipe system as part of a porometric measurement, whereby one or more pressure increases can be carried out. To provide a pressure increase, the controller increases the pressure setpoint values on at least one of the at least two pressure regulators, whereby different time constants and sequences can be provided for this purpose.

In one embodiment, the controller is configured to increase the pressure at a defined pressure increase rate, whereby the pressure increase rate depends on the remaining distance to the pressure target of the pressure increase, and whereby the greater the distance to the pressure target, the greater the pressure increase rate. This embodiment is based on the idea that regulation takes place in such a way that initially a rapid and then increasingly slower approach to a pressure setpoint value takes place. This makes it possible for the control to reach a new pressure setpoint value quickly without the risk of exceeding the new pressure setpoint value (as the pressure increase rate drops before the new pressure setpoint value is reached). Embodiments of this can provide that the pressure increase rate is proportional to the distance to the pressure target, i.e. decreases linearly as the distance decreases. However, this is only to be understood as an example.

Furthermore, it may be provided that the controller is intended and designed to realize a pressure increase in the pipe system several times as part of a porometric measurement, whereby after a pressure increase has taken place, a further pressure increase only takes place when the pressure of the last pressure increase has stabilized.

It is also possible that the controller is intended and designed to record and document the current values of the actual pressure value and the associated volume flow in the pipe system as measuring points. The measuring points form the basis of a porometric measurement.

A further embodiment provides that the controller is intended and designed to adapt the actual pressure at one point of the pipe system, in particular at its outlet, to one or more pressure setpoint values that follow one another in time on the basis of the evaluation of measured values using control algorithms.

With regard to the at least one pressure regulator, it should be noted that the pressure regulators used can be conventional pressure regulators according to the state of the art, in particular PID regulators. It may be provided that valves for flow control in the pipe system are integrated into the pressure regulators (forming the actuators of the control system), or that the pressure regulators provide a regulating variable for the configuration of externally arranged valves. The valves can be designed in such a way that they can be moved electrically and/or pneumatically so quickly and precisely that desired pressure values close to the sample can be achieved quickly and precisely during a porometric measurement. In this context, embodiments provide for electromagnetically moved valves.

According to a further aspect of the invention, the present invention relates to a control device for controlling a pressure of a fluid, comprising:

a pipe system for conveying a fluid, the pipe system having an inlet and an outlet and the fluid flowing in the pipe system from the inlet to the outlet,
 a regulating unit associated with the pipe system, which comprises:
 at least one pressure regulator, wherein the at least one pressure regulator generates a regulating variable for an actuator for configuring the flow of the fluid in the pipe system,
 a controller which is configured to specify a pressure setpoint value as a reference variable for the at least one pressure regulator, and
 at least one compensation volume arranged in the pipe system downstream of the at least one pressure regulator.

This aspect of the invention is based on the realization that the advantages associated with the provision of a compensation volume, namely that pressure fluctuations can be attenuated and averaged, are also achieved when only one pressure regulator is used. The use of only one pressure regulator can be sufficient, for example, if the pore size distribution of the sample to be measured is very inhomogeneous, so that no pressure dips need to be expected. By providing a compensation volume, it is possible to stop the pressure control at certain pressure points, so to speak, i.e. to achieve static pressure stability.

One embodiment provides for the volume of the compensation volume to be larger than the volume of the pipes between the pressure regulator and the outlet of the pipe system. The compensation volume is designed in particular as a tank that is connected to a pipeline of the pipe system downstream of the pressure regulator.

The above described embodiments apply in a corresponding manner to the aspect of a control device with only one pressure regulator. In particular, two parallel paths can also be formed in the pressure system (for a high-pressure region and a low-pressure region), in each of which a pressure regulator with an associated compensation volume is arranged.

According to a further aspect of the invention, the present invention relates to a porometer comprising:

a device for holding a sample to be measured; and a control device according to one of the preceding claims, which is connected upstream of the sample to be measured and pressurizes the sample to be measured with a fluid under defined pressure conditions.

For this purpose, one embodiment provides that in an operating state in which the control device applies a pressure to the sample to be measured in such a way that the fluid flows through the sample at least partially, the control device is designed in such a way that the pressure regulators are controlled via the control device in such a way that valves obtained in the pressure regulators for configuring the flow of the fluid in the pipe system are opened to such an extent that the flow through the pressure regulators is equal to the flow through the sample through which the fluid flows.

A further embodiment provides that in an operating state in which the control device applies a pressure to the sample to be measured in such a way that the fluid flows through the sample at least partially, the control device is designed in such a way that the pressure regulators are controlled via the control device in such a way that valves obtained in the pressure regulators for configuring the flow of the fluid in the pipe system are opened to such an extent that the flow through the pressure regulators deviates from the flow through the sample through which the fluid flows on average at most to such an extent that the change in pressure close to the sample does not exceed a predefined level.

The two aforementioned embodiments apply accordingly in the event that only one pressure regulator or one pressure regulator per path is provided.

BRIEF DESCRIPTION OF THE DRAWINGS

The invention will be explained in more detail on the basis of a plurality of exemplary embodiments, with reference being made to the figures, in which:

FIG. 6 is a flowchart of a method for performing a porometric measurement with a porometer as shown in FIG. 5.

DETAILED DESCRIPTION

Figure 1:
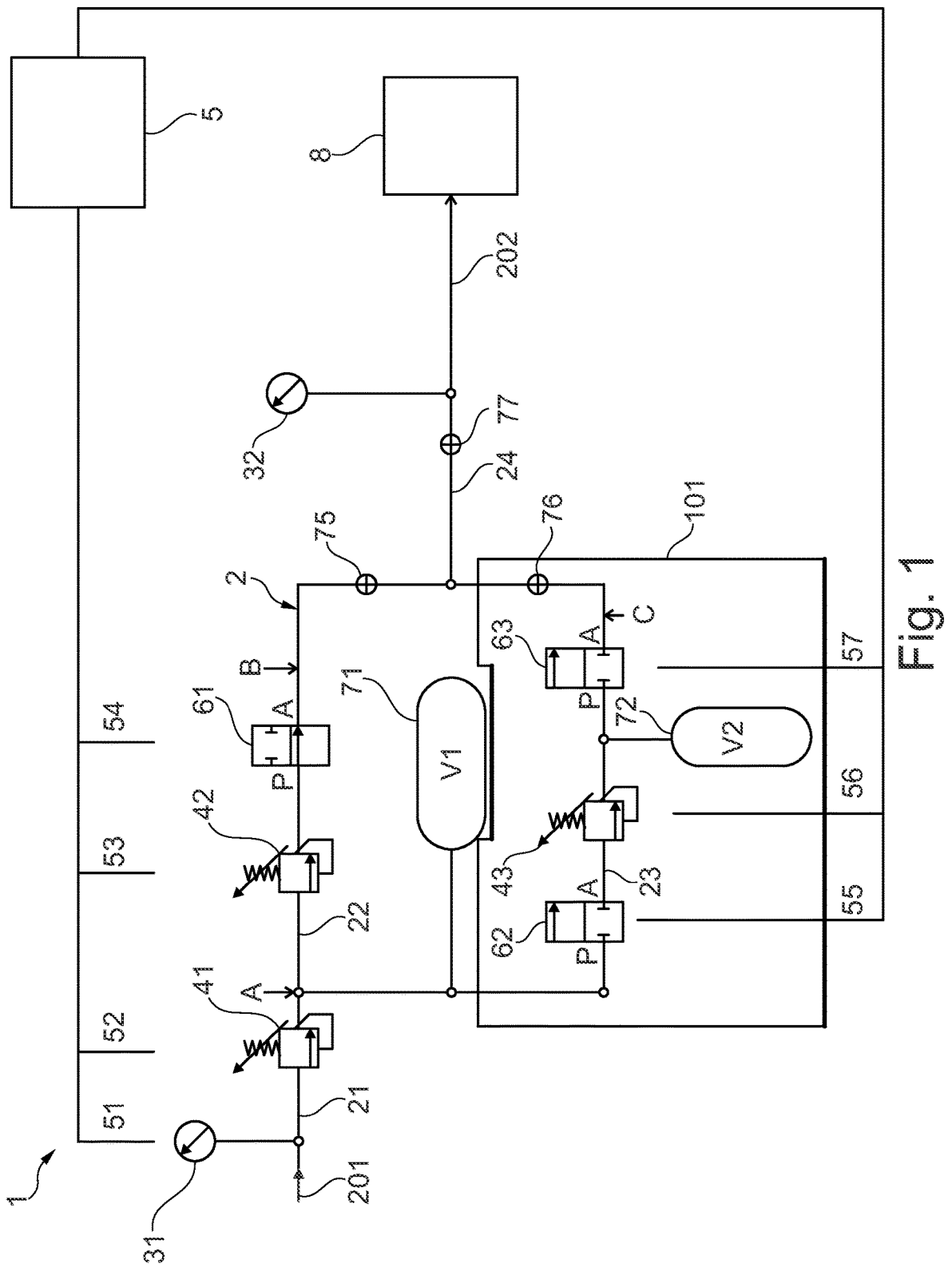
FIG. 1 is an embodiment of a control device for regulating a pressure in a pipe system, wherein the control device comprises a control device with two pressure regulators connected in series.

FIG. 1 shows an embodiment of a control device 1 for controlling the pressure of a fluid. The regulating unit comprises a regulating section and a regulating device.

The regulating section is formed by a pipe system 2 in which the fluid is conveyed. The pipe system 2 can be formed from pipes and/or hoses. It comprises an inlet path 21, which branches into two parallel pipe paths 22, 23, which reunite at the end of the pipe system 2 to form an outlet path 24. The beginning of the inlet path 21 forms an inlet 201 of the pipe system 2 and the outlet of the outlet path 24 forms an outlet 202 of the pipe system 2. Further sensors and/or a sample 8 of a porometric measurement can be connected to the outlet 202 of the pipe system 2, as explained with reference to FIG. 5.

Furthermore, the pipe system 2 comprises two compensation volumes 71, 72, as will be explained. The compensation volumes 71, 72 are formed, for example, by corresponding tanks with volumes V1, V2.

The pipe system 2 under consideration here is particularly suitable for conducting gases that are used for porometric measurement. In principle, however, the control device 1 can also be used to control the pressure in a liquid.

The regulating unit controls and regulates the volume flow in pipe system 2. It comprises several pressure regulators 41, 42, 43, an inlet pressure sensor 31, an outlet pressure sensor 32, several protection valves 61, 62, 63, several flow meters 75, 76, 77, and a controller 5.

The controller 5 communicates with the said components via schematically shown control lines 51-57, whereby it can receive data recorded by the components and/or transmit control commands to the components. For example, the controller 5 can transmit control commands to the pressure regulators 41, 42, 43, which relate to pressure setpoint values. The controller 5 can transmit control commands to the protection valves 61, 62, 63 that relate to the opening, closing or partial opening of the protection valves. The controller 5 can receive sensor signals from the inlet pressure sensor 31, the outlet pressure sensor 32 and the flow meters 75, 76, 77.

According to FIG. 1, the inlet pressure sensor 31 is arranged on the inlet side of the pipe system 2. The inlet pressure sensor 31 measures an actual pressure value on the inlet side and communicates this information to the controller 5.

Furthermore, a first pressure regulator 41 is arranged in the inlet path 21. A second pressure regulator 42 is arranged in the upper pipe path 22 and a third pressure regulator 43 is arranged in the lower pipe path 43. This means in each case that the corresponding pressure regulator 41, 42, 43 can influence the pressure in the corresponding path 21, 22, 23. This is done, for example, via a valve for flow control, which is a component of the respective pressure regulator. Such a valve represents an actuator of a regulation in the pressure regulator. Alternatively, a valve for flow control can be arranged in a separate component that is controlled by the respective pressure regulator.

It is provided that the valve for controlling the flow of the pressure regulator 41, 42, 43 can be moved quickly and precisely so that pressure values can be configured quickly and precisely. This is, for example, an electrically and/or pneumatically actuated valve, such as an electromagnetically actuated valve.

The one compensation volume 71 with the volume V1 is located both between the first pressure regulator 41 and the second pressure regulator 42 and between the first pressure regulator 41 and the third pressure regulator 43. The volume V1 is, for example, in the range between 200 ml and 400 ml.

The other compensation volume 42 with the volume (V2) is located downstream of the third pressure regulator 43 before the two paths 22, 23 rejoin. A further compensation volume may also be present downstream of the second pressure regulator 42 in a corresponding manner. The volume V2 is, for example, in the range between 50 ml and 200 ml.

Furthermore, a protection valve 61 is located downstream of the second pressure regulator 42. Two further protection valves 62, 63 are located upstream and downstream of the third pressure regulator 43. By controlling the protection valves 61-63 by the controller 5, either the upper pipe path 22 or the lower pipe path 23 can be switched or activated. It is intended that the upper pipe path 22 defines a high-pressure region of the control device, while the lower pipe path 23 defines a low-pressure region of the control device. The low-pressure region is indicated schematically in FIG. 1 by the box 101. Depending on which pressure is present in the pressure line 2, pressure control takes place either via the high-pressure region or the low-pressure region. However, these areas are not usually used in parallel.

One or more flow meters 75-77 can be provided on the output side, whereby the number of three flow meters shown is only to be understood as an example.

The outlet pressure sensor 32 measures the actual pressure value at the outlet of the pipe system 2 and provides this information to the controller 5 as a controlled variable.

The control unit 5 generates a pressure setpoint value for the pressure regulator 41 and a pressure setpoint value for the pressure regulator 42 or the pressure regulator 43. Based on these setpoint values, the pressure regulators 41, 42, 43 each perform pressure control autonomously in a first embodiment. They are designed, for example, as PI controllers or PID controllers.

Alternatively, in an embodiment, it is provided that the I component of the regulation of at least one of the pressure regulators 41-43, in particular all the pressure regulators involved, is carried out by the controller 5. In this case, the I component of the regulation in the pressure regulator 41-43 itself is switched off. Alternatively or additionally, the controller 5 can take over the P component and/or the D component of the respective pressure regulator 41-43. In order to realize this, the controller 5 takes over parts of the tasks of the firmware of the pressure regulators 41-43.

The series connection of two pressure regulators 41, 42 or 41, 43 in the respective flow path 21, 22 or 21, 23 in conjunction with the provision of one or more compensation volumes 71, 72 results in a strong reduction of occurring pressure fluctuations and enables virtually trouble-free and highly accurate controllable pressure control. This is shown schematically as an example in FIG. 2-4.

Figure 2:
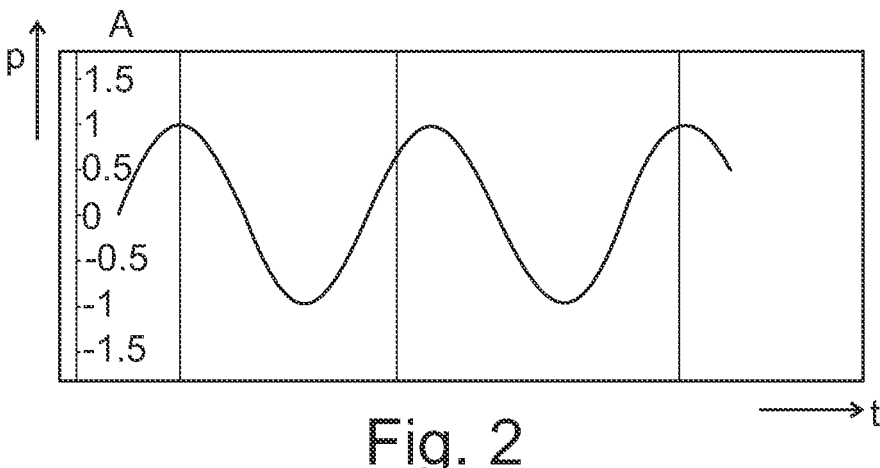
FIG. 2 is a schematic and exemplary pressure curve at point A of the control device of FIG. 1.

FIG. 2 shows the pressure curve at point A of FIG. 1, i.e. downstream of the first pressure regulator 41. The amplitude of the pressure fluctuation is still comparatively large, although it is already significantly reduced by the compensation volume 71 provided compared to the situation in which no such compensation volume 71 is present.

Figure 3:
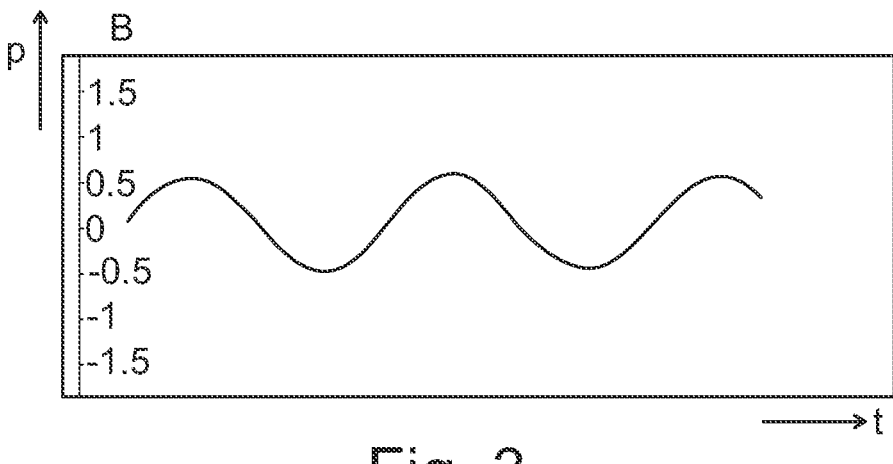
FIG. 3 is a schematic and exemplary pressure curve at point B of the control device of FIG. 1.

FIG. 3 shows the pressure curve at point B of FIG. 1, i.e. downstream of the second pressure regulator 42 of the upper path. At this point, consecutive pressure regulation has already taken place, first by the pressure regulator 41 and then by the pressure regulator 42. The pressure regulator 41 has carried out a pre-regulation of the pressure. It provides the downstream pressure regulator 42 with an inlet pressure that is smoothed as shown in FIG. 2 and—apart from the superimposed oscillation—is essentially constant. Due to the further regulation by the pressure regulator 42, the pressure has been further smoothed in accordance with FIG. 2.

Figure 4:
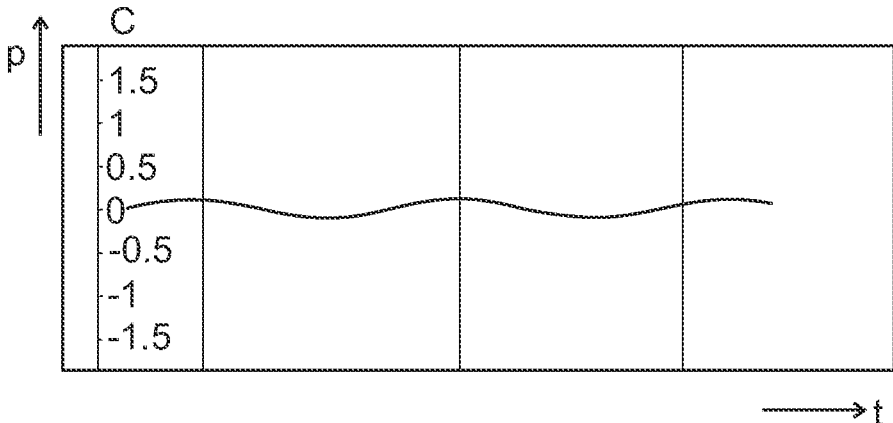
FIG. 4 is a schematic and exemplary pressure curve at point C of the control device of FIG. 1.

FIG. 4 shows the pressure curve at point C of FIG. 1, i.e. downstream of the second pressure regulator 43 of the lower path 23. The explanations for FIG. 2 apply accordingly. In addition, the pressure is further smoothed by the additional compensation volume 72. Accordingly, the pressure fluctuations in FIG. 4 are further reduced and have almost completely disappeared.

In this context, it is pointed out that due to the fact that the sizes of the pores that are currently opening at a certain pressure are inversely proportional to this same pressure (i.e. larger pores open at a comparatively low pressure), and further due to the fact that the opening of larger pores leads to greater pressure fluctuations, stable vibration-free pressure control is even more important in the low-pressure region than in the medium or high-pressure region. Accordingly, in FIG. 1, a further compensation volume V2 is only provided in the low-pressure region 101, although, as explained, this is only to be understood as an example.

The controller 5 is intended to realize a pressure increase in the pipe system 2 as part of a porometric measurement, for which purpose the controller 5 increases the pressure setpoint values at the pressure regulators 41-43. Such a pressure increase can take place several times as part of the porometric measurement, whereby after a pressure increase has taken place, a further pressure increase only takes place when the pressure of the last pressure increase has stabilized. It is intended that the current values of the actual pressure value and the associated volume flow (measured by the flow meters 75-77) are recorded as measuring points of the porometric measurement for a stabilized pressure.

Figure 5:
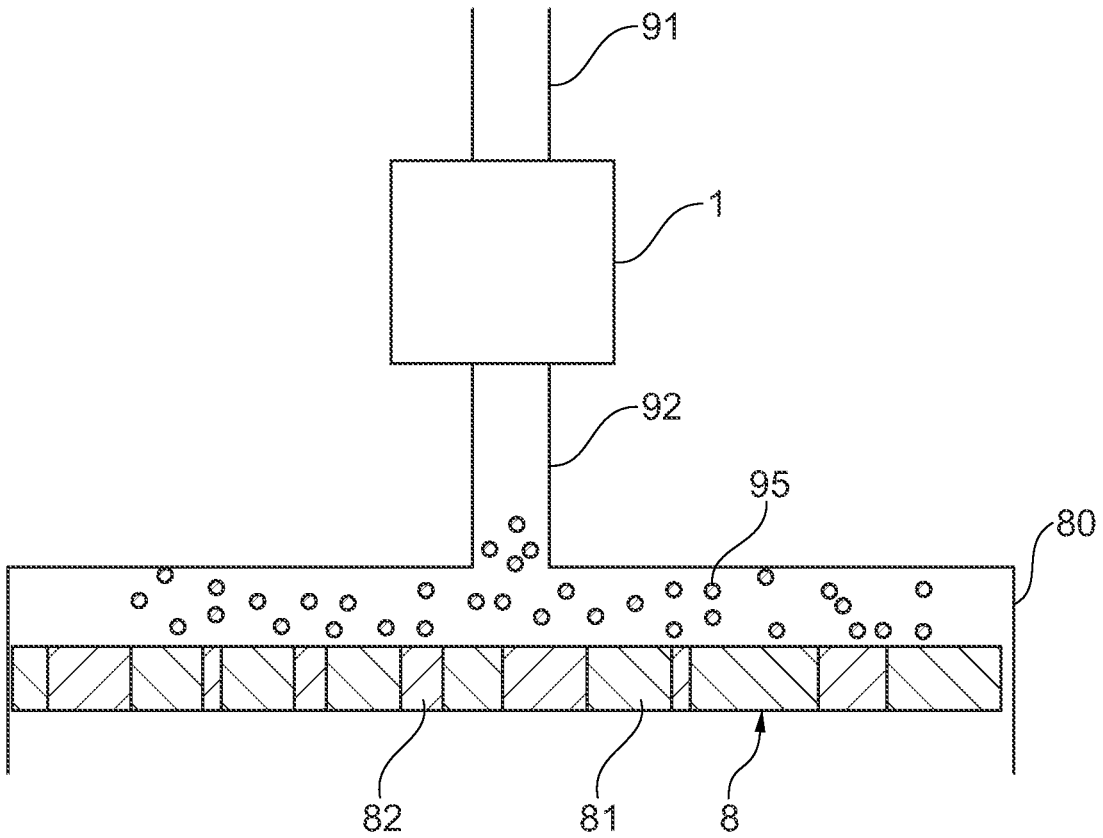
FIG. 5 is a schematic of a porometer with a sample to be measured and a control device.

Before such a method is explained by way of example with reference to FIG. 6, a porometer is considered schematically in FIG. 5. The porometer comprises a sample to be measured 8, which is arranged in a device 80. The sample contains areas 81 with sample material and pores 82 without sample material, which are sealed by a liquid. Gas 95 flows into the device 80 via a supply line 92. The gas 95 collects in the device 80 and, after reaching a corresponding pressure, pushes the liquid out of the pores 82, the gas 95 ejecting the liquid first from the pores 82 with the largest diameter and ejecting it last from the pores 82 with the smallest diameter. A measured value is recorded in each case when there is a change in the volume flow of the gas 95 due to the emptying of a pore (or a class of pores with the same diameter) (whereby in FIG. 5 all the pores are still closed). Such a porometric method is known to the skilled person, so that it will not be discussed further here.

The sample 8 or device 80 is preceded by a control device 1 as shown in FIG. 1, which receives gas via a supply line 91, which has a pressure in the range between 10 bar and 50 bar, for example. The gas is nitrogen, for example.

For a porometric measurement, it is necessary to increase the pressure several times and keep it as constant as possible in between. By cascading two pressure regulators in the control device 1 in accordance with the disclosure and the additional provision of compensation volumes, the control device 1 makes it possible to control the pressure with high precision and almost interference-free.

At the start of a measurement, the operating pressure to be kept constant for the first pressure regulator 41 is first determined in accordance with step 601 of FIG. 6 by defining a pressure setpoint value for the pressure regulator. Further, according to step 602, either the low-pressure region or the high-pressure region is selected for the measurement to be performed and the protection valves 61-63 are switched accordingly. If, for example, a measurement is made over the high-pressure region, the protection valves 62, 63 are closed so that the pressure regulator 43 is protected from high pressure.

According to step 603, after the pressure values at the first pressure regulator 41 have stabilized, the pressure setpoint value for the gas 95 at the outlet of the control device 1 is increased. For this purpose, certain pressure targets and step widths for the porometric measurement may have been defined beforehand. The pressure setpoint value is increased by adjusting the pressure setpoints at the two pressure regulators 41, 42 and 41, 43 accordingly.

The pressure setpoint value is increased according to step 604 by realizing a predefined pressure increase rate at which the pressure setpoint value is increased. It is intended that the pressure increase rate is variable and that its value depends on the distance between the actual pressure value and the pressure setpoint value (the desired pressure increase). This means that initially, when this distance is still large, the pressure rises quickly, while shortly before the pressure setpoint value is reached, the pressure rises only slowly. This enables a rapid realization of a pressure increase while avoiding the risk of exceeding the desired pressure setpoint value.

According to step 605, the pressure regulation for the second pressure regulator 42, 43 is frozen until a stable pressure and associated volume flow is configured. During this time, the setpoint for the second pressure regulator 42, 43 is no longer changed.

If a stable pressure is present, it may be provided that the valves mentioned for configuring the flow in the pressure regulators 41-43 are opened just wide enough so that the flow through the pressure regulators is equal to the flow through the closed sample 8. The stable state is thus maintained. Alternatively, it may be provided that the aforementioned valves for configuring the flow in the pressure regulators are opened to such an extent that the flow through the pressure regulators deviates from the flow through the flowing sample at most to such an extent that the change in pressure close to the sample does not exceed a predefined level and is thus harmless for the measurement.

If a stable pressure and associated flow are present, a corresponding measured value of the porometric measurement is recorded according to step 606. The pressure setpoint value can then be increased again, with steps 603-605 being repeated. A series of measured values of the porometric measurement is obtained.

Figure 7:
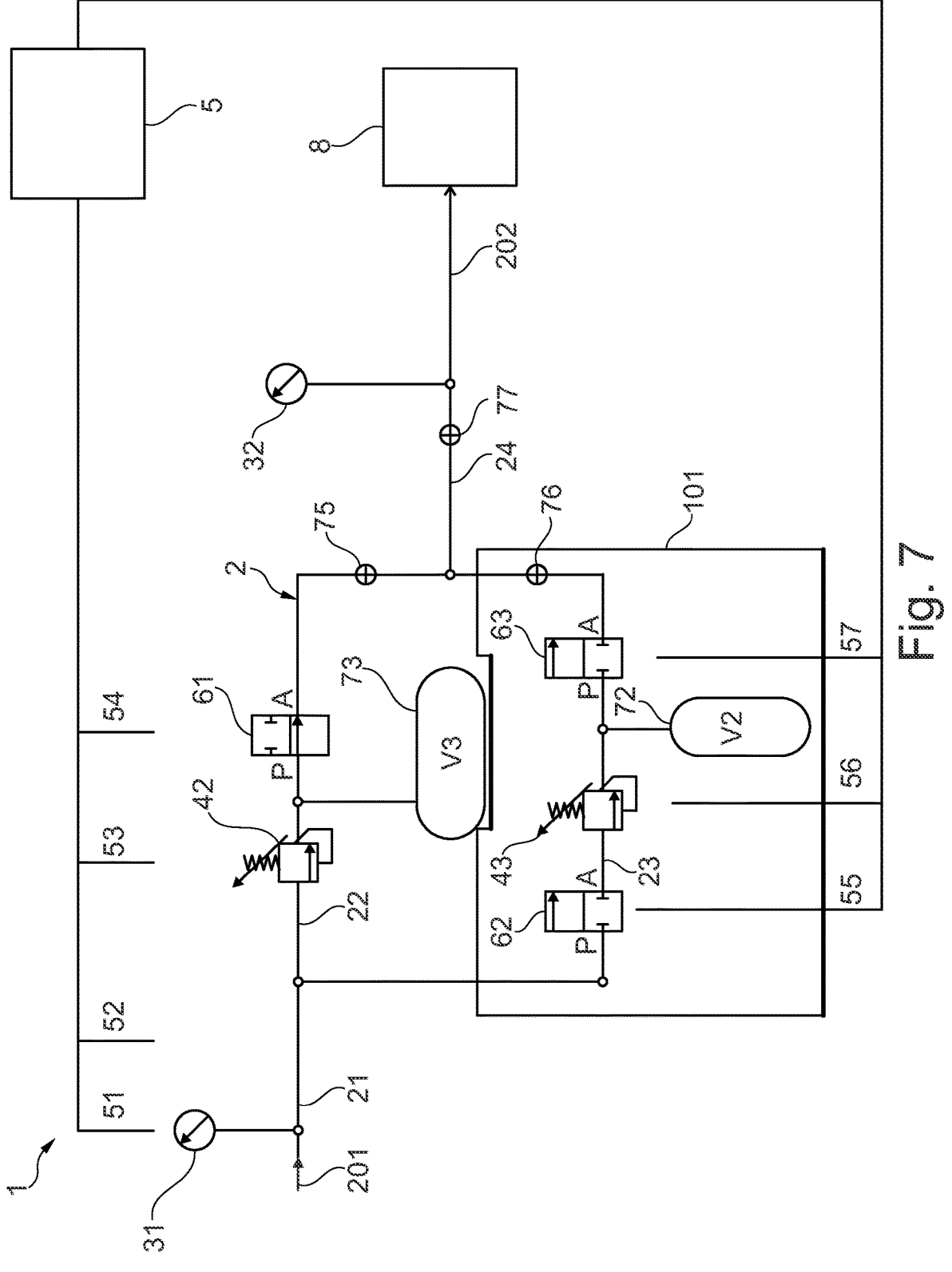
FIG. 7 is a further embodiment of a control device for regulating a pressure in a pipe system, wherein the control device comprises a control device with a pressure regulator and a compensation volume arranged behind it.

FIG. 7 shows a further embodiment which corresponds to the embodiment of FIG. 7 except for the fact that the control device does not have an input-side pressure sensor 71. Thus, only one pressure regulator 42, 43 is provided along each of the paths 22, 23. A compensation volume 73, 72 with a tank volume V3 or V2 is provided downstream of each of the pressure regulators 42, 43. The equalizing volumes 72, 73 are each provided, for example, by a separate tank which is connected to the pipeline downstream of the respective pressure regulator 42, 43.

With regard to FIG. 7, reference is also made to the explanation of FIG. 1.

It should be understood that the above description is intended for illustrative purposes only and is not intended to limit the scope of the present disclosure in any way. Also, those skilled in the art will appreciate that other aspects of the disclosure can be obtained from a study of the drawings, the disclosure and the appended claims. All methods described herein can be performed in any suitable order unless otherwise indicated herein or otherwise clearly contradicted by context. Various features of the various embodiments disclosed herein can be combined in different combinations to create new embodiments within the scope of the present disclosure. In particular, the disclosure extends to and includes all combinations and sub-combinations of one or more features described herein. Any ranges given herein include any and all specific values within the range and any and all sub-ranges within the given range.

What is claimed is:

1. A porometer, comprising:
a device for holding a sample to be measured; and
a control device for controlling a pressure of a fluid, which is arranged upstream of the sample to be measured and pressurizes the sample to be measured with a fluid under defined pressure conditions, wherein the control device comprises:
a pipe system for conveying a fluid, the pipe system having an inlet and an outlet and the fluid flowing in the pipe system from the inlet to the outlet,
a regulating unit associated with the pipe system, which comprises:
at least two pressure regulators, which comprise a first pressure regulator and a second pressure regulator, the first and second pressure regulators each generating a regulating variable for an actuator to configure the flow of the fluid in the pipe system, and
a controller, wherein
the first pressure regulator is arranged on an inlet side of the pipe system,
the second pressure regulator is arranged in series downstream of the first pressure regulator with respect to a direction of flow of the fluid in the pipe system, and
the controller is configured to specify a respective pressure setpoint value as a reference variable for the first pressure regulator and the second pressure regulator.

2. The porometer according to claim 1, wherein the pipe system forms a compensation volume in a region between the first pressure regulator and the second pressure regulator.

3. The porometer according to claim 2, wherein the volume of the compensation volume is greater than a volume of a pipe of the pipe system that extends between the first pressure regulator and the second pressure regulator.

4. The porometer according to claim 2, wherein the pipe system forms a further compensation volume downstream of the second pressure regulator.

5. The porometer according to claim 4, wherein the volume of the further compensation volume is greater than the volume of a pipe that extends between the second pressure regulator and the outlet of the pipe system.

6. The porometer according to claim 1, wherein the pipe system runs linearly without forming branches.

7. The porometer according claim 1, wherein the pipe system forms two parallel pipe paths between the inlet and the outlet, wherein
the at least two pressure regulators comprise the first pressure regulator, the second pressure regulator and a third pressure regulator,
the first pressure regulator is arranged on the inlet side of the pipe system before the pipe system branches into two parallel pipe paths, namely, a first pipe path and a second pipe path,
the second pressure regulator is arranged along the first pipe path, and
the third pressure regulator is arranged along the second pipe path.

8. The porometer according to claim 7, wherein one of the first and second pipe paths forms a high-pressure region of the control device, through which the fluid flows when the pressure is above a threshold pressure, and the other of the first and second pipe paths forms a low-pressure region, through which the fluid flows when the pressure is below the threshold pressure.

9. The porometer according to claim 8, wherein the pipe system comprises protection valves controllable by the controller, wherein the pipe path for the high-pressure region or the pipe path for the low-pressure region is activated by controlling the protection valves.

10. The porometer according to claim 1, wherein the regulating unit further comprises an inlet pressure sensor at a beginning of the pipe system, which measures an actual pressure value on the inlet side and feeds the actual pressure value to the controller.

11. The porometer according to claim 1, wherein the regulating unit further comprises an outlet pressure sensor at the outlet of the pipe system, which measures an actual pressure value at the outlet of the pipe system as a controlled variable, the controller detecting the actual pressure value measured by the outlet pressure sensor.

12. The porometer according to claim 1, wherein the first pressure regulator is configured to carry out a pre-regulation of the pressure in the pipe system, the first pressure regulator receiving a first pressure setpoint value from the controller.

13. The porometer according to claim 12, wherein the second pressure regulator is configured to carry out a fine regulation of the pressure in the pipe system, the second pressure regulator receiving a second pressure setpoint value from the controller.

14. The porometer according to claim 1, wherein the first and second pressure regulators are configured as PI or PID regulators, one of the first and second pressure regulators being configured in such a way that the I component of the regulation in that pressure regulator that is so configured is switched off or reduced, and the controller interacts with that pressure regulator in such a way that the I component of the regulation is carried out by the controller.

15. The porometer according to claim 1, wherein the first and second pressure regulators are configured as PI, PD or PID regulators, wherein one of the first and second pressure regulators is configured such that the P component and/or the D component of the regulation in that pressure regulator that is so configured is switched off or reduced, and the controller interacts with that pressure regulator such that the P com ponent and/or D component of the regulation is carried out by the controller.

16. The porometer according to claim 1, wherein in an operating state in which the control device applies a pressure to the sample to be measured in such a way that the sample in any case is partially flowed through by the fluid, the controller is configured such that:

the first and second pressure regulators are controlled via the controller in such a way that valves obtained in the first and second pressure regulators for the configuration of the flow of the fluid in the pipe system are opened to such an extent that the flow through the first and second pressure regulators is equal to the flow through the sample through which the fluid flows.

17. The porometer according to claim 1, wherein in an operating state in which the control device applies a pressure to the sample to be measured in such a way that the fluid flows at least partially through the sample, the controller is configured in such a way that:

the first and second pressure regulators are controlled via the controller in such a way that valves obtained in the first and second pressure regulators for the configuration of the flow of the fluid in the pipe system are opened to such an extent that the flow through the first and second pressure regulators deviates from the flow through the sample through which the fluid flows on average at most to such an extent that a change in pressure close to the sample does not exceed a pre-defined level.

* * * * *